United States Patent [19]

Salvat Dalmau et al.

[11] 4,110,118
[45] Aug. 29, 1978

[54] PROCESS FOR ACCELERATING THE DRYING OF OFFSET INKS

[75] Inventors: Juan Salvat Dalmau; Manuel Julián Lecha, both of Barcelona, Spain

[73] Assignee: Salvat Editores, S. A., Barcelona, Spain

[21] Appl. No.: 764,456

[22] Filed: Jan. 31, 1977

[30] Foreign Application Priority Data

Oct. 8, 1976 [DE] Fed. Rep. of Germany ....... 2645550

[51] Int. Cl.$^2$ ............................................. C09D 11/14
[52] U.S. Cl. ..................... 106/25; 106/210; 101/473; 101/416 B; 106/213
[58] Field of Search ................... 106/19–23, 106/25; 260/9; 428/913; 101/473

[56] References Cited

U.S. PATENT DOCUMENTS

| | | | |
|---|---|---|---|
| 3,464,936 | 9/1969 | Mathelin | 106/25 X |
| 3,834,823 | 9/1974 | Seregely et al. | 106/23 X |
| 3,948,827 | 4/1976 | Noshiro et al. | 260/9 X |
| 4,007,310 | 2/1977 | Miyamoto et al. | 428/913 X |

OTHER PUBLICATIONS

The American Ink Maker, May 1968 edition, pp. 70–71, & 128.

Primary Examiner—Joan E. Welcome
Attorney, Agent, or Firm—Wenderoth, Lind & Ponack

[57] ABSTRACT

A method is disclosed for accelerating the drying of offset inks. An additive composition comprising (a) 15 to 85 percent of functional amino polydimethylsiloxane and (b) 85 to 15 percent of a mixture of ethylene oxide and propylene oxide, wherein the ethylene oxide is present in an amount of from 15 to 85 percent with respect to the porpylene oxide, is added to an offset printing ink.

7 Claims, No Drawings

PROCESS FOR ACCELERATING THE DRYING OF OFFSET INKS

A fact verified and known to experts in offset printing is that a quicker drying of the printing is obtained with a stuccoed paper having an alkaline pH than with a paper having an acid pH and that the quickness in drying or setting bears a relation between the pH of the paper and the value of the pH, therefore reaching the following conclusion: the more alkaline the paper the quicker the drying of the printing and, therefore, the subsequent operations can be conducted with a greater speed; another important result is that by accelerating the drying or setting of the ink the risks of setoff are reduced.

In pursuit of an acceleration of offset printing inks, searches have been made to ascertain why paper manufacturers do not produce paper having an alkaline pH instead of an acid pH. Apparently this is subject to conditions relating to manufacture and price. Thus, although papers having an alkaline pH are available in the market, said alkalinity does not reach the coefficient necessary to obtain the required effects.

Since it is impossible to obtain results through this route and since it is known that the sought for quick drying action takes place between the alkaline surface of the paper and the ink, the inventors decided to alkalize the water which wet the printing plates, in the belief that the desired effect would also be obtained, inasmuch as the printing ink and the water are in contact on the printing plate.

Following this line of thought, it was discovered that, in an offset printing system, if the wetting water of the plates is alkaline, having a pH of 12 for example, a quick drying of the ink is obtained, practically in half the time when compared with water having the conventional acid pH, with a coefficient of 6.

This quicker drying or setting presents the additional advantage that, as a result of the alkaline coefficient of the water, the ink, on contacting the printing plate, has more affinity and a more uniform and compact printing is obtained which represents a stronger colour and a brighter luster than when printing with water having a pH of 6, as conventionally used.

Another appreciable advantage, consequence of the reduction in drying time, is that not only is the risk of setoff reduced, but the risk of stains due to the displacement of the printed sheets of paper on the sheets below them, is also reduced.

All the experts consulted as well as the text books and manuals published on this subject, such as: P. ALBISER in the review FACHHEFITE, USTRUNK en PAPIER VERARBEITER, A. BASTERO on RELACIONES TINTA PAPER, circulars on information AFAG, J. CUSSINYER in this book RELACIONES TINTA PAPEL, Cátedra de Tecnologia Papelera de TARRASA - España, K. KEIM in his book PAPEL, coincided in that it would be impossible to print with the water having an alkaline pH since the following problems would arise:

saponification of the ink and, consequently, emulsion of the colour of said ink since the alkali will react with the fatty acids of the ink.

disappearance of the lacquer of the offset plates and, therefore, disappearance of the image to be printed due to the etching of the alkali on said lacquer.

possible "application" of the water on the stuccoed paper, due to the etching of the alkali on the surface of the paper.

In spite of the aforegoing, the pertinent tests were conducted.

In the first test, the water was alkalized with amines and the result was negative. The aforementioned problems arose.

In the subsequent tests a solution of ammonia was used as the alkaline agent. The results were satisfactory but variable, since it was observed, inasmuch as ammonia is a volatile substance, that the results varied depending on the concentration of this alkali in the water.

when a pH of 12 was maintained constant, a very clean printing, a very spectacular luster, and a quick drying were obtained. However, the reaction achieved was not stable since, as the ammonia evaporated, the pH descended toward neutral and these qualities were slowly lost.

It was simultaneously verified that none of the problems, mentioned in the text books and consultations made which define the state of the art, took place.

Considering that a good line of investigation had been found, the tests were continued. A dosifier which maintained the concentration of the ammonia and, therefore, the pH of 12 constant, was installed on the water tank of the machine. The excellent characteristics in the quality of the printing were maintained and the sheets dried quickly.

An unforeseen problem then arose. Residues were accumulated on the dampening rollers which wet the plate with water, which residues prevented the flow of the water and defects were produced in the printing. Furthermore, this accumulation of residues, when a determined level was reached, was discharged rapidly and passed to the plate, which produced a serious defect in the printing.

To avoid this latter drawback, it was necessary to clean the water wetters every 2 hours, which implied a stoppage of the machine for a longer time than that of effective operation.

Subsquently, it was found that the residues which accumulated on the dampening rollers were the product of the cleansing which the wetting water at pH of 12 effected on the plates.

The water was then alkalized with sodium hypochlorite instead of ammonia, but although a slight improvement was observed, this alkali was corrosive and could even oxidize specific parts of the printing machine. Thus, this idea was abandoned.

Consequently, ammonia was again used, but at low temperatures, cooling the ammonium water to $-2°$ C and, to avoid the formation of ice, 5% of isopropyl alcohol was added.

The covers of the wetters were removed from the four-body Ultra Man printing machine on which the tests were made in order to avoid rough surfaces whereon the residues could be deposited. Although this subtilty did not give positive results in the former test, in this test, with the ammonia at a low temperature, the results were good, since the drying qualities and the luster of the inks were maintained, the accumulations in the wetters and, therefore, the sporadic discharges of said accumulations, disappeared.

Now then, the problem still continues since the printing plates are cleaned and the residues are likewise deposited on the wetters, a portion of these residues being discharged to the inking bacteria while the remainder is dried on the wetters. Therefore, they should be cleaned every 5 or 6 hours, otherwise the layer would split from the ends of the wetters towards the center.

In effect, when printing with a conventional pH, a pH or 6 for example, a slight "veil" appears between the image filling points on the plate, coming from the printing colour itself, which does not stain the paper during printing because this is prevented by the water. However, it does stain when the wetting water is slightly reduced. That is to say, an equilibrium should be established between the wetting water and the ink so that the latter does not tend to be situated between one point and another.

When water having a pH of 12 is used, this "veil" between the points does not appear, since it is hauled by the water. Thus, the points and the spaces therebetween were perfectly clean on the plate and, therefore, they do not appear on the paper, but on the contrary, this unnecessary ink is deposited on the dampening rollers which wet the plate.

This inconvenience confirmed, contrary to that contemplated by the present state of the art and as a result of the theories and studies determined by said art, what had already been deduced throughout the research process, that is to say, that a better cleaning of the plates takes place with water having a pH of 12 than with water having a pH of 6, and therefore the quality of the printing is better.

However, this virtue is, in principle, negative since the project is not feasible.

Due to all these inconveniences, another route was decided on in order to achieve the same object: accelerating the drying of inks.

Thus, instead of operating on the water directly, and in order to obtain the desired effect, printing with water having a pH of 12, the inks were operated on directly and the water indirectly.

Having consulted the offset printing ink manufacturers, they manifested the unfeasibility of the project since the vegetable oils composing the printing ink have an acid nature and if an alkali were added thereto, a reaction would be produced which would make the printing ink useless.

Thus, the search was directed to encounter a substance which, although capable of alkalizing the wetting water, does not react in an alkaline manner with the ingredients of the ink.

A polymer of the silicon types was decided on, and tests were conducted with the siloxanes which are chemically inactive and are altered by the action of diluted acids, as in the case of the fatty acids of offset inks.

The first test carried out along this line of investigation, was conducted by adding to a conventional offset printing ink 4% by weight of a functional amino polydimethylsiloxane which is a silicon polymer available in the market and used to improve the luster of chassis of automobiles and to protect them from oxidation, increasing their resistance to the abrasive action and from detergents, and protecting them from corrosion of the chrome and aluminum.

The results of this test can be classified as very good. The printing ink dried quickly and, therefore, there were no setoffs nor "scratches", a high increase in the luster of the ink and a greater cleanliness in the printing were observed. There was no accumulation in the water wetters nor problems with regards to precipitation in the printing ink.

It seemed that the accepted route had definitely been found to solve the proposed question. Thus, the initiated route was improved, with the purpose of eliminating minor drawbacks such as the tendency to greasing of the printing plates which is manifested in the appearance of a thin layer of ink in the zones of the plate which should not be inked, and above all the already obtained advantages were increased and improved.

Furthermore, a test was made with a nonionic tensoactive agent comprised of a combined ethylene and propylene oxide product, whose main characteristic, for the case in question, is that the ethylene oxide is hydrophilic while the propylene oxide is hydrophobic.

For the end purpose in question, a nonionic tensoactive mixture was used, in principle, comprised of 20% ethylene oxide and 80% propylene oxide, in the assumption that in this way the sufficient affinity of the ink plus the ethylene oxide content with respect to the printing water, and the rejection by the propylene oxide of the excess water would be achieved, whereby polymerization of the ink and, therefore, its quick drying would be facilitated.

Consequently various tests were carried out, adding to a conventional offset printing ink certain amounts of the tensoactive agent described in the preceding paragraph. Thus in one of the tests 1% was added to the ink, while in subsequent tests 2, 3 and 4% was added, respectively.

The results were good, obtaining a good drying of the inks and an increase in luster. However, a certain lack of repellency to the water was observed in the image reserve zone of the plate.

Subsequent to these tests, new tests were conducted inverting the proportions of the mixture of the tensoactive agent, that is to say 20% propylene oxide and 80% ethylene oxide.

The proportion added to the ink was of 3% and the result was better than in the prior test since, while maintaining the same positive characteristics, the repellency to water in the imaging zone of the printing plate was improved.

The tests were continued, adding to the ink different percentages, between 1 and 8%, of the mentioned mixture. 42 different tests were conducted and all of them gave, to a greater or lesser degree, the positive qualities desired, thus obtaining:
quick drying of the ink;
greater luster of the ink; and
greater cleanliness of the printing.

As a result of the quick drying of the ink, the risk of setoff of the printing is reduced; the risk of staining through surface displacement (hauling) of the sheets of paper is also reduced.

It was observed that no accumulations were produced on the dampening rollers in all these cases.

Finally, the conclusion was reached that the definite solution resided in a combined use of a functional amino polydimethylsiloxane and the mixture comprised of propylene oxide plus ethylene oxide.

To this effect, a composition was prepared containing 25% functional amino polydimethylsiloxane and 75% of a mixture comprising 20% propylene oxide and 80% ethylene oxide, 3% of which compound was added to the ink. The results obtained were excellent.

Another composition was prepared containing functional amino polydimethylsiloxane and 75% of a mixture comprised of 20% ethylene oxide and 80% propylene oxide. 2% of this composition was added to the ink and the results exceeded those of the preceding test.

After various tests, it can be affirmed that the combined use of from 1 to 5% of the compound comprised of 25% of functional amino polydimethylsiloxane as a mixture containing 20% of ethylene oxide and 80% of propylene oxide added to a conventional offset ink really constitutes an ideal solution.

The combined action of the product on the ink produces its effects at the time of printing and, consequently, it can be incorporated directly to any one of the inks available in the market at the time of use, or else it can be included in said ink during its manufacture.

When the additive ink passes from the ink block to the plate it contacts the water and the functional amino polydimethylsiloxane, which is dissolved in the fatty vehicle of the ink, is hydrolyzed in the presence of the acid water with which the printing plate has been dampened. This hydrolization produces a splitting, freeing the functional amine, which alkalizes the water on the plate.

While the silicons are operatively free, the alkaline water is absorbed by the tensoactive agent comprised of the propylene oxide and ethylene oxide with the regulating effect compensated for by the hydrophobic and hydrophilous nature of the respective oxides.

As a result thereof, breakage of the double bonds of the carbonated chains and of the ink takes place, which admit oxygen. Thus, an oxypolymerization, catalyzed by the oxides, is produced.

The silicon, on the other hand, produces in the ink a slippery effect without abrasion, improving the transference of the ink, besides it ascends to the surface of the printing forming a lubricous layer which rapidly takes shape until an apparent drying is produced.

Under these circumstances drying of the ink is accelerated in such a way that in many cases it completely prevents setoff and scratches which the sheets could undergo at the exit of the printing machine.

To verify the rsults obtained, an offset printing machine having four bodies of the Ultra Man type, Model VII-G, was used. To obtain a four-colour print 3% of a mixture comprised of 25% functional amino polydimethylsiloxane plus 75% ethylene and propylene oxides, in a ratio of 20% ethylene oxide and 80% propylene oxide, was added to each one of the inks used.

In order to add technical difficulties to the test, a printing plate was used whose etching was of 80% of printed surface.

On the other hand, a stuccoed paper, both surfaces of which had a luster, was chosen, having dimensions of 109 × 151 cm. and a gram weight of 100 gms/m$^2$, giving a 164 gram weight per sheet.

All these difficulties were gravely increased by the fact that the working speed of the machine was fixed at about 7,800sheets/hour.

Under these conditions, tests were conducted, using two types of ink;
(a) CIDESA type G-7, having the following viscosities and forces:

|  | VISCOSITIES | FORCES |
|---|---|---|
| Yellow | 720 poises | 19,000 dynes |
| Blue | 640 poises | 18,000 dynes |
| Red | 550 poises | 17,000 dynes |

-continued

|  | VISCOSITIES | FORCES |
|---|---|---|
| Black | 350 poises | 10,000 dynes |

(b) FICIS, class LAMPOLUX:

|  | VISCOSITIES | FORCES |
|---|---|---|
| Yellow | 475 poises | 8,500 Dynes |
| Blue | 290 poises | 15,000 Dynes |
| Red | 710 poises | 18,500 Dynes |
| Black | 375 poises | 11,000 Dynes |

1½ hours after printing, the drying of the ink was sufficient to enable printing of the sheet again on the surface opposite to that already printed.

Thorough drying was achieved between 8 and 12 hours after printing.

An identical test, using the same types of ink and paper, was conducted with the printing machine used in the preceding test, but in this case no additions were made to the ink and, discarding the problems which were presented with regards to setoff and scratches, the ink was not sufficiently dry to enable printing of the other side of the sheet until 5 or 6 hours had lapsed, and the thorough drying of the sheet, as from the time of printing, took place from 24 to 72 hours.

The printing inks were used under identical conditions only adding 4% of functional amino polydimethylsiloxane. The drying time to enable printing was of ¾ to 1¼ hours, while the thorough drying did not take place until 12 to 18 hours after printing had lapsed.

In a subsequent test, 3% of a compound comprised of 20% ethylene oxide and 80% propylene oxide was added to the printing inks used. The drying time to enable printing of the sheet was of 1 to 1½ hours, while the thorough drying did not take place until 18 to 24 hours from printing had lapsed.

The mentioned tests, we repeat, were conducted with two different types of inks. In each case their behaviour was similar.

The climatic conditions of the premises, the paper, the printing machine, the working speed, etc. were always the same.

The parameters obtained in the various tests establish the following comparative summary:

|  | Drying time Intermediate | Drying time thorough |
|---|---|---|
| Conventional ink | 5 to 6 hrs. | 24 to 72 hrs. |
| Complete additive ink | ½ to 1 " | 8 to 12 " |
| Ink to which only functional amino polydimethylsiloxane has been added | ¾ to 1¼ hrs. | 12 to 18 " |
| Ink to which only ethylene oxide and propylene oxide have been added | 1 to 1¾ " | 18 to 24 " |

The advantage of the rate of drying should not only be contemplated from the point of view of a time saver, irrespective of the importance thereof and irrespective of the benefit derived from a reorganization within the planning and working automation of each one of the operational steps undergone by the sheet of paper from printing until it forms part of the assembly to which it pertains: book, fascicle, review, pamphlet, catalogue, etc., but they should also be considered from another more important point of view, that is to say the printing quality.

On the other hand, this acceleration of the drying takes place from the very instant in which the ink contacts the water and, therefore, in many cases neither setoffs nor scratches are produced, not even when operating under high speeds.

In effect, when in any type of paper, carton or paperboard, one or two colours are used without superposition of the points (for example uniform colours), no kind of anti-offset agent is necessary.

Although the risk of setoff is remarkably reduced, there are many cases in which it is necessary to add to the printing inks an anti-setoff agent. Therefore, the behaviour of the product was studied when, to the ink wherein it was added, an anti-setoff product is added.

Therefore, using the same printing machine, an identical paper and identical operating speed, an anti-setoff product based on starches was added to the same inks containing a functional amino polydimethylsiloxane and ethylene and propylene oxides in the aforementioned percentages.

Specifically, the product used was based on starch granules, the shell of which is broken, dispersed in an aliphatic solvent in the presence of an acid salt. 3% by weight of this product was added to the printing ink and its behaviour was perfect without apparent alteration in the behaviour of the functional amino polymethylsiloxane and the ethylene and propylene oxides immersed in the ink.

The intermediate drying and complete drying tests subsequently carried out, gave identical parameters to those obtained in prior experiments.

No setoff nor scratches were produced and the quality of the printing was optimum.

We claim:

1. In the process for offset printing employing an offset printing ink, the improvement according to which the offset printing ink contains from 0.5 to 8 percent by weight of an additive composition comprising
    (a) 15 to 85 percent functional amino polydimethylsiloxane, and
    (b) 85 to 15 percent of a mixture of ethylene oxide and propylene oxide wherein the ethylene oxide is present in said mixture in an amount of from 15 to 85 percent with respect to the propylene oxide.

2. A process according to claim 1 the printing ink contains from 1 to 5 percent by weight of the additive composition.

3. A process according to claim 1 wherein the printing ink contains fom 0.5 to 20 percent by weight of a starch based anti-setoff product.

4. A process according to claim 3 wherein the starch based anti-setoff product comprises starch granules, the shells of which are broken, dispersed in an aliphatic solvent in the presence of an acid salt.

5. A composition for use as an additive for offset printing inks which comprises
    (a) 15 to 85 percent functional amino polydimethylsiloxane and
    (b) 85 to 15 percent of a mixture of ethylene oxide and propylene oxide wherein the ethylene oxide is present in said mixture in an amount of from 15 to 85 percent with respect to the propylene oxide.

6. A composition according to claim 5 containing 15 to 35 percent functional amino polymethylsiloxane and 85 to 65 percent of the mixture of ethylene oxide and propylene oxide, the ethylene oxide being present in said mixture in an amount of from 10 to 30 percent with respect to the propylene oxide.

7. In an offset printing ink composition the improvement according to which the composition contains from 0.5 to 8 percent by weight of an additive composition comprising
    (a) 15 to 85 percent functional amino polydimethylsiloxane, and
    (b) 85 to 15 percent of a mixture of ethylene oxide and propylene oxide wherein the ethylene oxide is present in said mixture in an amount of from 15 to 85 percent with respect to the propylene oxide.

* * * * *